US006679067B1

(12) United States Patent
Pate et al.

(10) Patent No.: US 6,679,067 B1
(45) Date of Patent: Jan. 20, 2004

(54) CRYOGENIC PROCESSES FOR TREATING PANTYHOSE

(75) Inventors: Mike Pate, White Halls, AR (US); Dick Reed, Boulder, CO (US)

(73) Assignee: C W Holdings LLC, Memphis, TN (US)

( * ) Notice: Subject to any disclaimer, the term of this patent is extended or adjusted under 35 U.S.C. 154(b) by 0 days.

(21) Appl. No.: 10/197,744

(22) Filed: Jul. 16, 2002

Related U.S. Application Data

(60) Provisional application No. 60/305,787, filed on Jul. 16, 2001.

(51) Int. Cl.[7] .............................................. F25D 25/00
(52) U.S. Cl. ............................................. 62/62; 62/304
(58) Field of Search ................................ 62/62, 65, 80, 62/304, 337

(56) References Cited

U.S. PATENT DOCUMENTS

| | | | | |
|---|---|---|---|---|
| 2,609,150 | A | 9/1952 | Bludeau ...................... | 241/15 |
| 2,879,005 | A | 3/1959 | Jarvis .......................... | 241/14 |
| 3,277,656 | A | 10/1966 | Bill et al. ...................... | 62/63 |
| 3,551,536 | A | 12/1970 | Guerreiro ..................... | 264/28 |
| 3,891,477 | A | 6/1975 | Lance et al. ................. | 148/125 |
| 3,920,781 | A | 11/1975 | Cogswell ...................... | 264/98 |
| 3,953,270 | A | 4/1976 | Ford .............................. | 156/80 |
| 4,095,012 | A | 6/1978 | Schirmer ..................... | 428/474 |
| 4,397,158 | A | * 8/1983 | Brenik et al. ................. | 62/380 |
| 4,469,649 | A | 9/1984 | Ibar .............................. | 264/23 |
| 4,654,094 | A | 3/1987 | Ritter .......................... | 156/80 |
| 4,739,622 | A | 4/1988 | Smith ............................ | 62/78 |
| 5,044,422 | A | 9/1991 | Lenker .......................... | 165/2 |
| 5,179,821 | A | 1/1993 | Worsfold ....................... | 62/64 |
| 5,232,641 | A | 8/1993 | Williamson et al. ......... | 264/40 |
| 5,346,725 | A | * 9/1994 | Targosz ..................... | 427/389.9 |
| 5,505,894 | A | 4/1996 | Frankfort et al. ...... | 264/172.15 |
| 5,759,209 | A | 6/1998 | Adler et al. .................. | 8/142 |
| 5,786,444 | A | 7/1998 | Shimajiri et al. ........... | 528/503 |
| 5,824,248 | A | 10/1998 | Sweet et al. ................. | 264/211 |
| 5,830,393 | A | 11/1998 | Nishikawa et al. ........... | 264/50 |
| 5,863,298 | A | 1/1999 | Fulton et al. .................. | 8/138 |
| 6,120,558 | A | 9/2000 | Poddevin et al. ............ | 8/137.5 |
| 6,332,325 | B1 | 12/2001 | Monfort ........................ | 62/62 |

FOREIGN PATENT DOCUMENTS

| | | | |
|---|---|---|---|
| EP | 0 065 896 | 4/1982 | ............. F25D/3/10 |
| JP | 3-217422 | 9/1991 | .............. C08J/3/00 |

OTHER PUBLICATIONS

Web Site: Beauty Style—www.i–asianwomen.com.my/bs/btips/btips.htm.
Web Site: Pantyhose Budget Buster—www.stretcher.com/stories/970919a.cfm.
Web Site: Golf Balls—www.commandline.ab.ca/cryo-bond/novelties.html.
Web Site: Coldfire—www.coldfire.com/index.htm.
Web Site: Cryogenics International, Cryogenic Treatment Applications—www.goodnet.com`cryo/applicat.htm.
Web Site: Cold Facts—www–csa.fnal.gov/csa_bin/back_issues/spring96/spring96_1.html.

* cited by examiner

*Primary Examiner*—Henry Bennett
*Assistant Examiner*—Malik N. Drake
(74) *Attorney, Agent, or Firm*—Thomas, Kayden, Horstemeyer & Risley, LLP

(57) ABSTRACT

A process for treating pantyhose in a cryogenic processor to produce cryogenically treated pantyhose that have enhanced wearing qualities is described. In this regard, one such process, among others, can be broadly summarized by the following steps: reducing the temperature of the pantyhose to between about −80° C. and about −240° C. over about a 1 to 6 hour time period; holding the temperature of the pantyhose between about −80° C. and about −240° C. for a 6 to 48 hour time period; and allowing the pantyhose to increase in temperature to about 25° C. over a 3 to 48 hour time period. The cryogenic treatment of pantyhose results in enhanced wearing qualities.

26 Claims, 3 Drawing Sheets

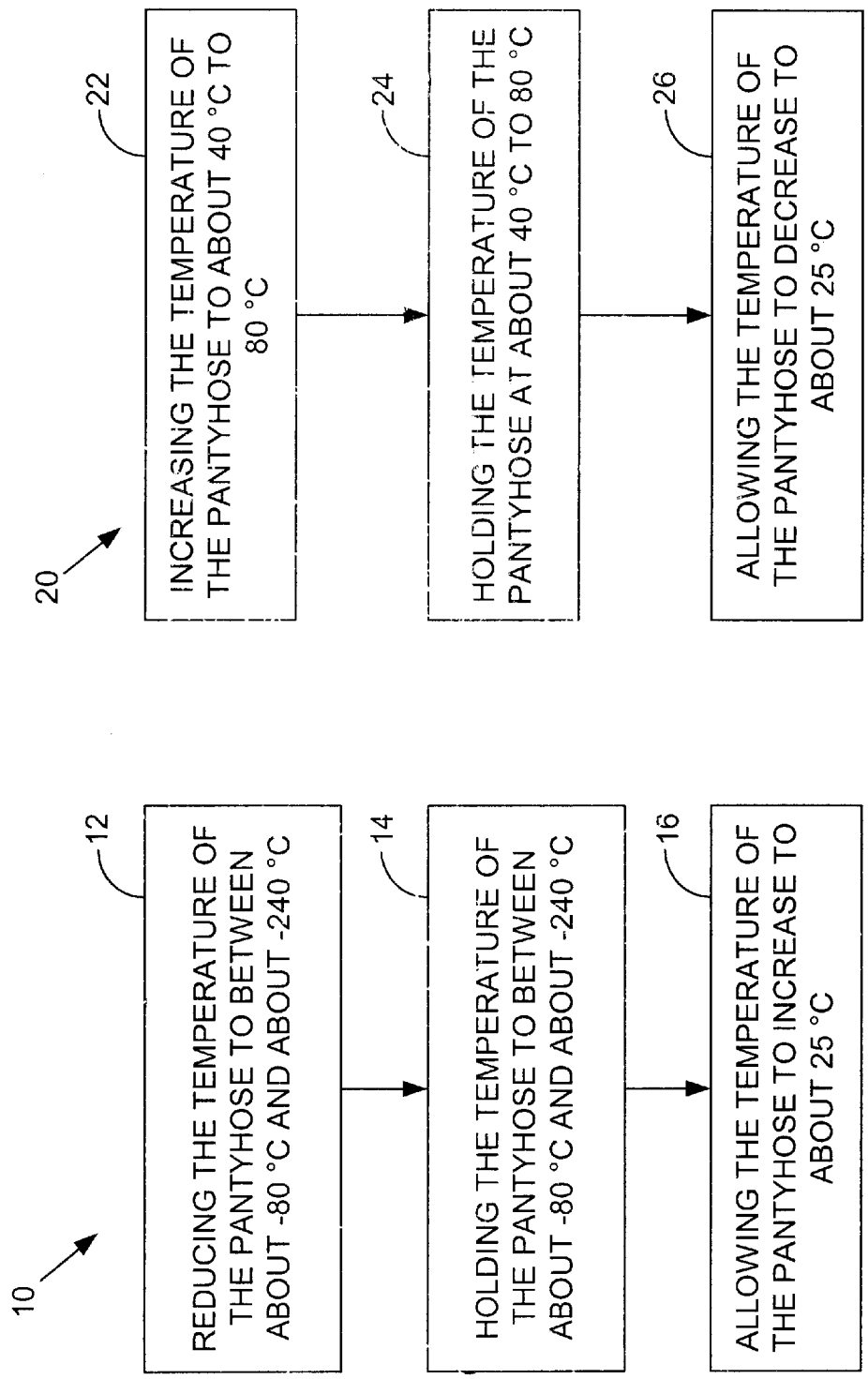

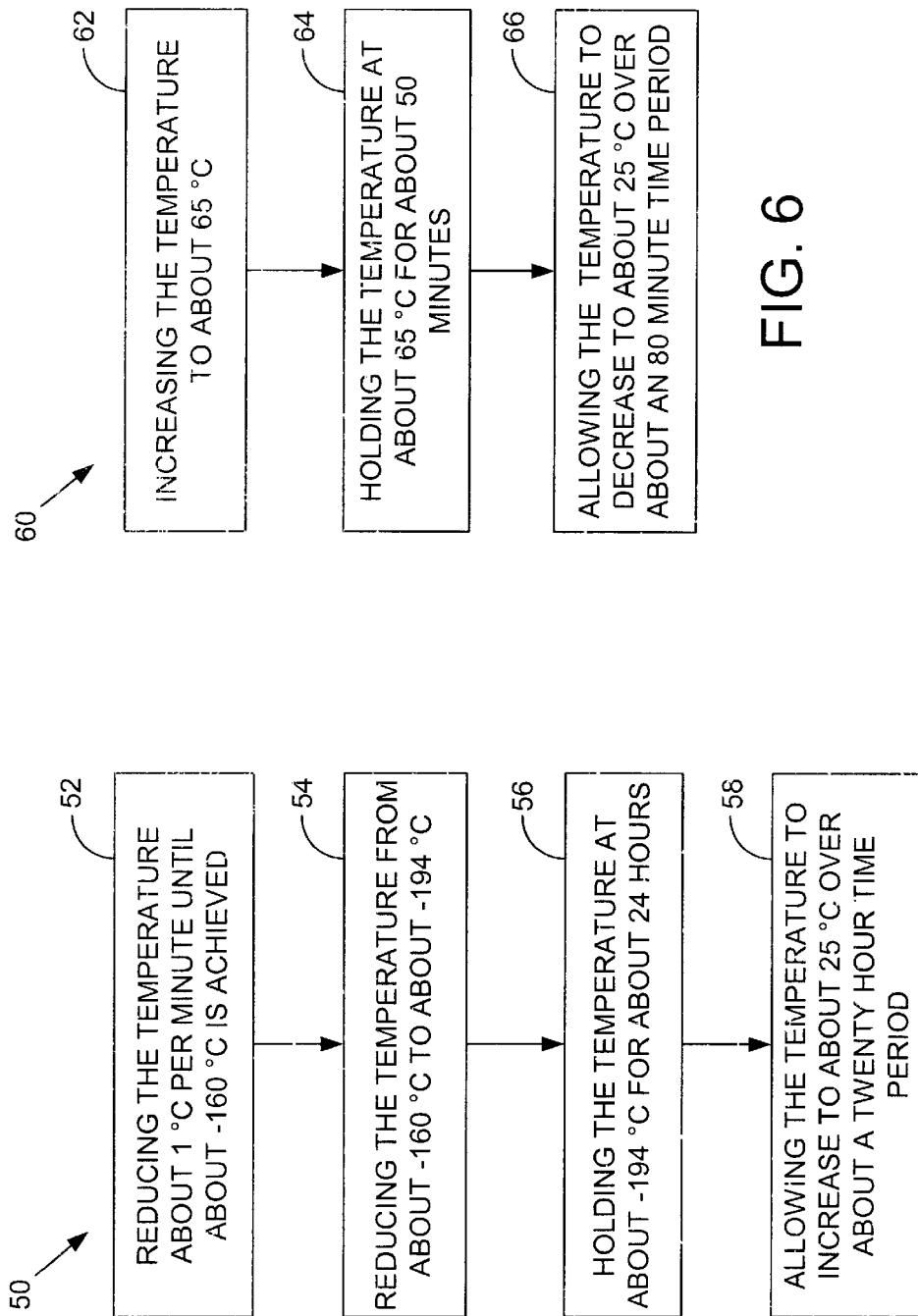

CRYOGENIC PROCESSES FOR TREATING PANTYHOSE

CROSS-REFERENCE TO RELATED APPLICATION

This application claims priority to U.S. provisional application entitled, "CYROGENIC PROCESS FOR TREATING PANTYHOSE," having ser. No. 60/305,787, filed Jul. 16, 2001, which is entirely incorporated herein by reference.

TECHNICAL FIELD

The present invention is generally related to the quality of pantyhose and, more particularly, is related to a process for enhancing the durability of pantyhose.

BACKGROUND

Fabrics produced by machines include fabrics knitted from continuous filaments such as ladies' hosiery and the like. Filament fabrics are made of elongated knittable or continuous structure, as distinguished from spun yarn. The continuous filaments are characterized by having a uniform cross section and a smooth surface. One of the difficulties with filamentary knitted materials of fine gauge is that the stitches are susceptible to laddering. For example, in pantyhose, a loop stitch broken at the knee may cause a ladder along the length of the stocking. When pantyhose are worn, they are susceptible to lateral tension, which tends to weaken and break loop stitches and cause successive stitches to unwind and disengage.

Significantly, pantyhose and other thin fiber fabrics are very susceptible to running, punctures, snags, wear and damage when they come into contact with finger nails and other abrasive articles such as corners of drawers and dressers and other sharp objects. Nylon and other synthetic fibers used to make pantyhose can also be weakened and damaged by prolonged exposure to heat, sunlight (ultraviolet radiation), rain, or body perspiration. When a fiber is severed or damaged, the integrity of the entire fabric is adversely affected and the resulting damage spreads to surrounding areas which generally causes the garment to lose its appeal and effectiveness.

In the past, pantyhose have been treated to resist runs by spraying the hosiery with adhesive material. However, the adhesive material would form visible patterns and be seen as a blemish on the hosiery, and the adhesive material drastically reduces the elasticity of the pantyhose.

Accordingly, an improved treatment for pantyhose, which increases the resistance of fabrics and reduces the possibility of fiber rupture without adverse effects while overcoming the aforementioned deficiencies, would be extremely useful and desirable.

SUMMARY OF THE INVENTION

The present invention provides a process for treating pantyhose in a cryogenic processor to produce cryogenically treated pantyhose that have enhanced wearing qualities. In this regard, one embodiment of such a process, among others, can be broadly summarized by the following steps: reducing the temperature of the pantyhose to between about −80° C. and about −240° C. over about a 1 to 6 hour time period; holding the temperature of the pantyhose between about −80° C. and about −240° C. for a 6 to 48 hour time period; and allowing the pantyhose to increase in temperature to about 25° C. over a 3 to 48 hour time period.

In another embodiment, the process described above includes the following steps: increasing the temperature of the pantyhose to about 40 to 80° C. over about a 30 to 120 minute time period; holding the temperature of the pantyhose at about 40 to 80° C. for about a 15 to 60 minute time period; and allowing the pantyhose to decrease in temperature to about 25° C. over about a 50 to 120 minute time period.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Aspects of embodiments of the invention can be better understood with reference to the following drawings.

FIG. 1 is a flow diagram illustrating a representative embodiment of the cryogenic process.

FIG. 2 is a flow diagram illustrating a representative embodiment of the heat tempering process.

FIG. 5 is a flow diagram illustrating still another representative embodiment of the cryogenic process.

FIG. 6 is a flow diagram illustrating still another representative embodiment of the heat tempering process.

DETAILED DESCRIPTION

Figures 3, 4:
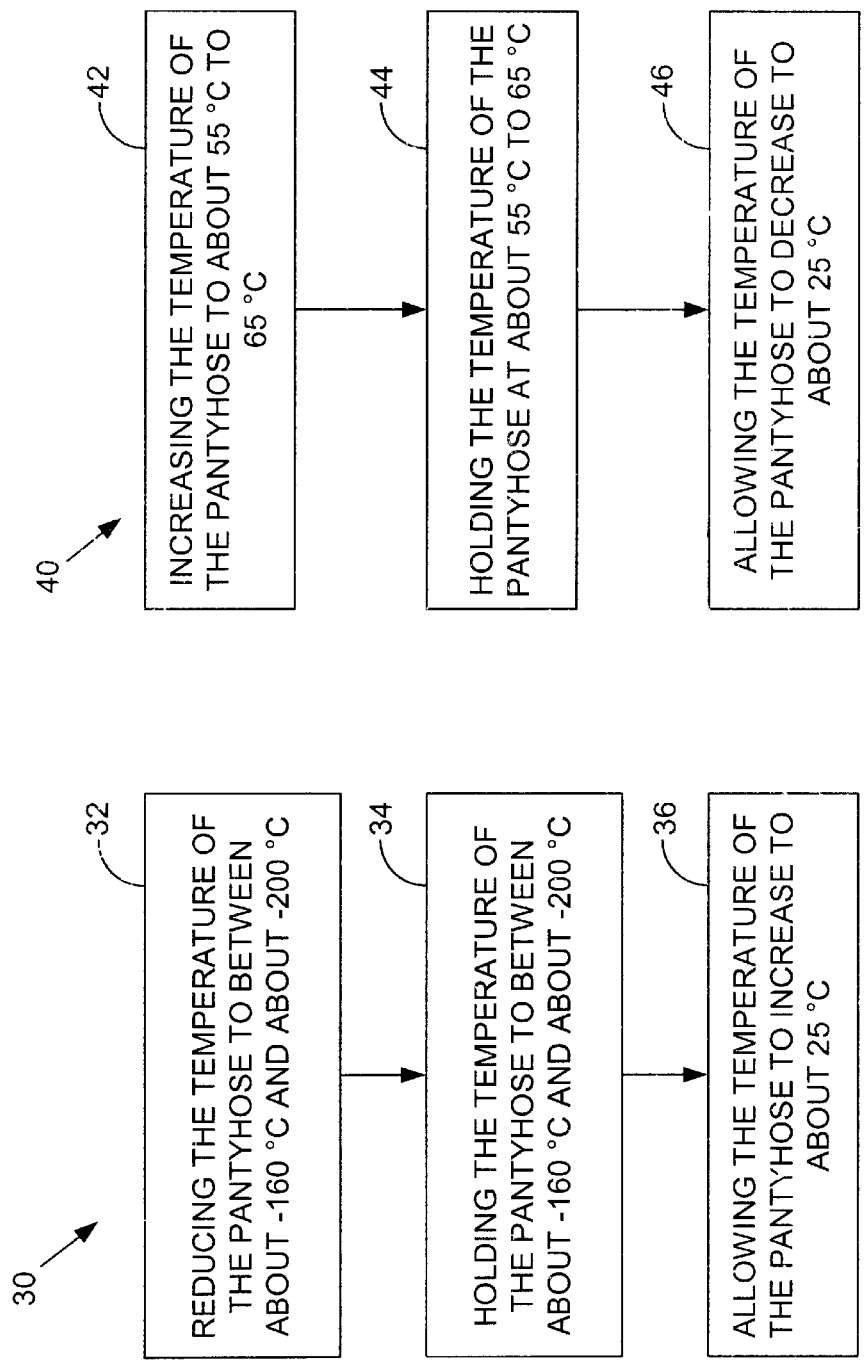
FIG. 3 is a flow diagram illustrating another representative embodiment of the cryogenic process.
FIG. 4 is a flow diagram illustrating another representative embodiment of the heat tempering process.

The present invention provides a process for treating pantyhose in a cryogenic processor to produce cryogenically treated pantyhose that have enhanced wearing qualities that overcome some of the aforementioned deficiencies. In general, the treatment processes are capable of enhancing the physical properties of the pantyhose if the treatment processes are performed under particular temperature treatment conditions.

In this regard, embodiments of the present invention provide for a process for enhancing the wearing qualities (e.g., durability; lifetime; resistance to running, punctures, etc.; damage due to exposure to heat, sunlight, perspiration, etc.) of pantyhose by cryogenically treating the pantyhose. In addition, embodiments of the present invention provide for a process that includes cryogenically treating the pantyhose and subsequently heat tempering the pantyhose. The cryogenic treatment can be performed in a processor (i.e., cryogenic or deep cryogenic processors), hereinafter "cryogenic processor," while the heat tempering can be performed in an oven or other heating system.

Generally, cryogenic treatment of materials includes a process of chilling the particular material down to relatively near absolute zero (0 K or −273° C.) and maintaining that temperature until the material has cold-soaked. The temperature is then allowed to rise (e.g., heated in an oven or allowed to warm under ambient conditions) until ambient temperature equilibrium is reached. The benefit of cryogenically treating such materials is that one or more physical properties are enhanced (e.g., durability, strength, etc.).

Simply subjecting a material to a cryogenic process does not ensure that one or properties of the material is enhanced. The complexity of the cryogenic treatment process involves determining and achieving the proper operating conditions for treatment of the material of interest such as, but not limited to, pre-treatment of the material; the rate of decreasing and increasing temperature; duration of the cold-soaking and warming cycles; etc.

Generally, cryogenic processors are double walled, insulated containers partially filled with a cryogenic fluid (e.g., liquid nitrogen or liquid helium) for establishing an extremely cold storage environment. Since cryogenic fluids have a low boiling point and, thus, a low heat of vaporization, heat inflow from the ambient atmosphere can cause significant losses of the cryogenic fluids due to the evaporation. Therefore, some cryogenic processors include thermal and radiant barriers such as insulation and/or a high vacuum between the container walls. The vacuum space can also be filled with multiple layers of insulation to reduce heat transfer.

FIG. 1 is a flow diagram that illustrates a representative cryogenic process 10 of the present invention. The pantyhose can be placed into the cryogenic processor directly or the pantyhose can be placed inside the cryogenic processor inside the original package or other appropriate package. As shown in block 12, the temperature of the pantyhose is reduced to between about −80° C. and −240° C. over about a 1 to 6 hour time period. Alternatively, the pantyhose can be reduced to a temperature between about −100° C. and −220° C., about −120° C. and −210° C., about −140° C. and −200° C., or about −160° C. and −190° C. In addition, the time period for reducing the temperature of the pantyhose can range from about 2 to 5 hours and from about 3 to 4 hours.

Next and as shown in block 14, the temperature of the pantyhose is held between about −80° C. and −240° C. for a 6 to 48 hour time period. Alternatively, the pantyhose can be held at a temperature between about −100° C. and −220° C., about −120° C. and −210° C., about −140° C. and −200° C., or about −160° C. and −190° C. In addition, the time period for holding the temperature of the pantyhose can range from about 10 to 36 hours, about 15 to 30 hours, or about 20 to 24 hours.

Subsequently, as shown in block 16, the temperature of the pantyhose is allowed to increase to a temperature of about 25° C. over about a 3 to 48 hour time period. Alternatively, the time period for allowing the pantyhose to increase in temperature can range from about 3 to 24 hours or about 12 to 24 hours.

FIG. 2 is a flow diagram that illustrates a representative heat tempering process 20 that may be used in some embodiments. As shown in block 22, the temperature of the pantyhose is increased to about 40° C. to 80° C. over about a 30 to 120 minute time period. Alternatively, the temperature that the pantyhose can be increased to about 55° C. to 65° C., while the time period can range from about 40 to 60 minutes. Next, as shown in block 24, the temperature of the pantyhose is held at about 40° C. to 80° C. for about a 30 to 80 minute time period. Alternatively, the time period for holding the temperature of the pantyhose can be range from about 45 to about 65 minutes. Subsequently, as shown in block 26, the temperature of the pantyhose is allowed to cool to about 25° C. over about a 50 to 120 minute time period. Alternatively, the time period for allowing the pantyhose to cool can range from about 70 to 90 minutes.

FIG. 3 is a flow diagram that illustrates another representative cryogenic process 30 of the present invention. The pantyhose can be placed into the cryogenic processor directly or the pantyhose can be placed inside the cryogenic processor inside the original package or other appropriate package. As shown in block 32, the temperature of the pantyhose is reduced to between about −160° C. and −200° C. over about a 2 to 3 hour time period. Next and as shown in block 34, the temperature of the pantyhose is held between about −160° C. and −200° C. for a 20 to 24 hour time period. Subsequently, as shown in block 36, the temperature of the pantyhose is allowed to increase to a temperature of about 25° C. over about a 12 to 24 hour time period.

FIG. 4 is a flow diagram that illustrates another representative heat tempering process 40 that may be used in some embodiments. As shown in block 42, the temperature of the pantyhose is increased to about 55 to 65° C. over about a 40 to 60 minute time period. Next, as shown in block 44, the temperature of the pantyhose is held at about 55 to 65° C. for about a 45 to 65 minute time period. Subsequently, as shown in block 46, the temperature of the pantyhose is allowed to cool to about 25° C. over about a 70 to 90 minute time period.

FIG. 5 is a flow diagram that illustrates another cryogenic process 50 that includes decreasing the temperature in the cryogenic processor at a rate of about 1° C. per minute from ambient temperature to about −160° C. using an appropriate cryogenic fluid (e.g., liquid nitrogen), as shown in block 52. As shown in block 54, the temperature of the cryogenic processor is reduced to a temperature of about −194° C. Next, as shown in block 56, the temperature of the cryogenic processor is then held at about −194° C. for about 24 hours. Thereafter, the cryogenic processor is allowed to vent, which allows the cryogenic fluid to evaporate off at a rate dictated by the temperature of the room in which the cryogenic processor is located, typically ambient room temperature, and the degree to which the cryogenic vent is opened. Subsequently, as shown in block 58, the pantyhose are allowed to warm at a rate such that the warming process takes longer than about 20 hours.

The temperature of the room in which the cryogenic processor is located, typically ambient room temperature, and the degree to which the cryogenic vent is opened dictates the rate at which the pantyhose warms. After the pantyhose have warmed to ambient temperature, the pantyhose are removed from the cryogenic processor and placed onto a drying rack until substantially dry. The cryogenically treated pantyhose show enhanced wearing qualities.

Alternatively to warming the pantyhose in the cryogenic processor, the pantyhose can be removed from the cryogenic processor after the cryogenic fluid has evaporated, placed onto a drying rack, and allowed to warm at a rate such that the warming process takes longer than about 20 hours. Here, the rate of warming the pantyhose is dictated by the temperature of the room in which the pantyhose are removed to, typically ambient room temperature. After the pantyhose have warmed to ambient temperature, the pantyhose are placed onto a drying rack until substantially dry.

FIG. 6 is a flow diagram that illustrates another heat tempering process 60. After the pantyhose have warmed to ambient temperature, the pantyhose are removed from the cryogenic processor and, if applicable, are taken out of the package that the pantyhose were placed into. As shown in block 62, the pantyhose are placed into an oven to be warmed. The oven is warmed from ambient temperature to about 65° C. over about a 50 minute time period. Next, as shown in block 64, the oven is held at about 65° C. for about 50 minutes. Thereafter the oven is allowed to cool to ambient temperature over a time period of about 80 minutes, as shown in block 66. After the pantyhose have cooled to ambient temperature, the pantyhose are placed back into the appropriate package.

In another embodiment the pantyhose can be pre-treated with an aqueous solution. After the pantyhose are pre-treated with an aqueous solution, the excess solution is pressed out of the pantyhose and then placed in an appropriate cryogenic package such as a freezer bag. The pantyhose can be placed into the cryogenic processor directly or the pantyhose can be placed inside the cryogenic processor inside the original package or other appropriate package. After the pantyhose are placed in the cryogenic processor, the pantyhose can be treated in a manner consistent with cryogenic processes 10 and 30 and or heat tempering processes 20 and 40.

Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A process for enhancing the wearing quality of pantyhose, comprising the step of:

treating the pantyhose in a cryogenic processor in a single cycle process, wherein the cryogenic processor is at a temperature in the range of about −80° C. to about −240° C.

2. The process of claim 1, wherein treating further comprises:

reducing the temperature of the pantyhose about 1° C. per minute until about −160° C. is achieved;

reducing the temperature of the pantyhose from about −160° C. to about −194° C.;

holding the temperature of the pantyhose at about −194° C. for about 24 hours; and allowing the pantyhose to increase in temperature to about 25° C. over at least about a twenty hour time period.

3. The process of claim 2, further comprising:

pre-treating the pantyhose with an aqueous solution.

4. Pantyhose prepared by the process of claim 1.

5. A process for enhancing the wearing quality of pantyhose, comprising:

reducing the temperature of the pantyhose about 1° C. perminute until about −160° C. is achieved;

reducing the temperature of the pantyhose from about −160° C. to about −194° C.;

holding the temperature of the pantyhose at about −194° C. for about 24 hours;

allowing the pantyhose to increase in temperature to about 25° C. over at least about a twenty hour time period;

increasing the temperature of the pantyhose to about 65° C.;

holding the temperature of the pantyhose at about 65° C. for about 50 minutes; and allowing the pantyhose to decrease in temperature to about 25° C. over about an 80 minute time period.

6. The process of claim 5, further comprising:

pre-treating the pantyhose with an aqueous solution.

7. The process of claim 5, further comprising:

drying the pantyhose until substantially dry.

8. Pantyhose prepared by the method of claim 5.

9. A process for enhancing the wearing quality of pantyhose, comprising:

reducing the temperature in a cryogenic processor to about −160° C. over a 2 hour time period;

reducing the temperature of the cryogenic processor from about −160° C. to about −194° C.;

holding the temperature of the cryogenic processor at about −194° C. for about 24 hours; and allowing the pantyhose to increase in temperature to about 25° C. over at least about a twenty hour time period.

10. The process of claim 9, further comprising the steps of:

placing the pantyhose in an oven;

increasing the temperature of the oven to about 65° C.;

holding the temperature of the oven at about 65° C. for about 50 minutes; and allowing the pantyhose to decrease in temperature to about 25° C. over about an 80 minute time period.

11. The process of claim 10, further comprising:

drying the pantyhose until substantially dry.

12. The process of claim 9, further comprising:

pre-treating the pantyhose with an aqueous solution.

13. The process of claim 9, further comprising:

drying the pantyhose until substantially dry.

14. Pantyhose prepared by the method of claim 7.

15. A process for enhancing the wearing quality of pantyhose, comprising:

reducing the temperature of the pantyhose to between about −80° C. and about −240° C. over about a 1 to 6 hour time period;

holding the temperature of the pantyhose between about −80° C. and about −240° C. for a 6 to 48 hour time period; and allowing the pantyhose to increase in temperature to about 25° C. over a 3 to 48 hour time period.

16. The process of claim 15, further comprising:

increasing the temperature of the pantyhose to about 40 to 80° C. over about a 30 to 120 minute time period;

holding the temperature of the pantyhose at about 40 to 80° C. for about a 30 to 80 minute time period; and allowing the pantyhose to decrease in temperature to about 25° C. over about a 50 to 120 minute time period.

17. The process of claim 16, further comprising:

drying the pantyhose until substantially dry.

18. The process of claim 15, further comprising:

pre-treating the pantyhose with an aqueous solution.

19. The process of claim 15, further comprising:

drying the pantyhose until substantially dry.

20. Pantyhose prepared by the method of claim 15.

21. A process for enhancing the wearing quality of pantyhose, comprising:

reducing the temperature of the pantyhose to between about −80° C. and about −240° C. over about a 1 to 6 hour time period; and allowing the pantyhose to increase in temperature to about 25° C. over a 3 to 48 hour time period.

22. Pantyhose prepared by the method of claim 21.

23. A process for enhancing the wearing quality of pantyhose, comprising:

reducing the temperature of the pantyhose to between about −80° C. and about −240° C. over about a 1 to 6 hour time period;

holding the temperature of the pantyhose between about −80° C. and about −240° C.; and allowing the pantyhose to increase in temperature to about 25° C.

24. Pantyhose prepared by the method of claim 23.

25. A process for enhancing the wearing quality of pantyhose, comprising:

reducing the temperature of the pantyhose to between about −80° C. and about −240° C.;

holding the temperature of the pantyhose between about −80° C. and about −240° C.; and allowing the pantyhose to increase in temperature to about 25° C.

26. Pantyhose prepared by the method of claim 25.

* * * * *